United States Patent [19]

Rupp et al.

[11] 4,287,165

[45] Sep. 1, 1981

[54] PREPARATION OF HIGH PURITY PHOSPHORUS

[75] Inventors: Arthur F. Rupp, Oak Ridge; David V. Woo, Knoxville, both of Tenn.

[73] Assignee: The United States of America as represented by the United States Department of Energy, Washington, D.C.

[21] Appl. No.: 137,096

[22] Filed: Apr. 4, 1980

Related U.S. Application Data

[63] Continuation of Ser. No. 831,194, Sep. 7, 1977, abandoned.

[51] Int. Cl.$^3$ .................. C01B 25/01; C01B 25/02; C01B 25/04; C01B 25/10
[52] U.S. Cl. ............................ 423/323; 423/299; 423/300
[58] Field of Search .................. 423/300, 323, 299

[56] References Cited

U.S. PATENT DOCUMENTS 3,511,599  5/1970  Suriani .................. 423/323

OTHER PUBLICATIONS

Hulter, Contribution a l'Etude de l'Action de l'Hydrogen sur les Phosphates An. de Chim, June 1953.

Primary Examiner—O. R. Vertiz
Assistant Examiner—Gregory A. Heller
Attorney, Agent, or Firm—Allen H. Uzzell; Stephen D. Hamel; James E. Denny

[57] ABSTRACT

High purity phosphorus and phosphorus compounds are prepared by first reacting $H_3PO_4$ with a lead compound such as PbO to form $Pb_3(PO_4)_2$. The $Pb_3(PO_4)_2$ is reduced with $H_2$ at a temperature sufficient to form gaseous phosphorus which can be recovered as a high purity phosphorus product. Phosphorus compounds can be easily prepared by reacting the phosphorus product with gaseous reactants. For example, the phosphorus product is reacted with gaseous $Cl_2$ to form $PCl_5$. $PCl_5$ is reduced to $PCl_3$ by contacting it in the gaseous phase with solid elemental phosphorus. $POCl_3$ can be prepared by contacting $PCl_5$ in the gaseous phase with solid $P_2O_5$. The general process is particularly suitable for the preparation of radiophosphorus compounds.

3 Claims, 2 Drawing Figures

PREPARATION OF HIGH PURITY PHOSPHORUS

BACKGROUND OF THE INVENTION

This invention was made in the course of, or under, a contract with the United States Energy Research and Development Administration. It relates to the preparation of high purity phosphorus and phosphorus compounds from phosphoric acid.

This is a continuation of application Ser. No. 831,194, filed Sept. 7, 1977, now abandoned.

High purity phosphorus is conventionally prepared by heating phosphate rock in the presence of sand and coke in an electric furnace at 2300°–2700° C. See, for example, *Mellor's Modern Inorganic Chemistry*, G. D. Parks, ed., John Wiley and Sons, Inc., New York (1961) pp 811–813. The high temperatures make the electric furnace process very expensive. Crude phosphoric acid, such as wet process phosphoric acid, is relatively inexpensive. Wet process phosphoric acid is prepared by reacting phosphate rock with sulfuric acid to produce phosphoric acid and a precipitate of calcium sulfate. An inexpensive low temperature process for producing elemental phosphorus from phosphoric acid has long been needed.

Phosphorus compounds such as $PCl_3$, $PCl_5$, $POCl_3$, etc. are useful in the chemical industry for a variety of applications. For example, $PCl_3$ and $PCl_5$ are routinely used to transform hydroxyl groups of organic compounds into chlorides. High purity phosphorus compounds are useful in the manufacture of pharmaceuticals, particularly radioactively labeled compounds useful in tracer studies and potentially useful for detection and treatment of cancerous tissue. Incorporation of radioisotopes of phosphorus ($^{33}P$ and $^{32}P$) into radiopharmaceuticals which concentrate in malignant neoplasms offers potential therapeutic advantage because the beta radiation (particularly the short range beta of $^{33}P$) should provide maximum irradiation of the target cells with minimal damage to contiguous healthy tissue.

Processes for the manufacture of radioactive chemicals must be capable of handling small amounts (millimoles) of materials—since very high specific activity is required and should be high in yield since expensive radioisotope preparations are used. In addition, such processes must require a minimum of manual manipulation since they are ordinarily carried out in shielded environments, glove boxes, etc. High temperatures, above about 1000° C., are also to be avoided since they complicate remote handling, etc.

Several methods for preparing radiolabeled phosphorus compounds, such as $^{32}PCl_3$, $^{32}PCl_5$ and $^{32}POCl_3$ have been described in the prior art. The reduction of phosphoric acid or alkaline earth phosphates to liberate elemental phosphorus has been carried out using carbon at high temperatures as the reductant followed by chlorination to produce $PCl_3$, $PCl_5$ and $POCl_3$. See J. A. Kafalas, J. Am. Chem. Soc., 79:4260 (1957); J. R. Bocquet, Ann. Soc. Roy. Sci. Med. Nat. Brussels, 9:161 (1956); and R. A. Oosterbaan, et al, J. Am. Chem. Soc., 78:5641 (1956). Another method involved the direct production of phosphorus by carbon reduction of phosphates and simultaneous chlorination, see B. Witten et al, J. Am. Chem. Soc., 70:399C (1948). The chief difficulties with these prior art processes for preparing radiophosphorus compounds were the requirements for high temperatures, long reaction times, difficult controls and the direct handling of radioactive materials required.

SUMMARY OF THE INVENTION

It is an object of this invention to provide a process for preparing high purity phosphorus and phosphorus compounds.

It is a further object to provide a process which requires minimum mixing and manual manipulation.

It is a further object to provide a low temperature process for preparing high purity elemental phosphorus from impure phosphoric acid, such as wet process phosphoric acid.

It is a further object to provide a process which is capable of producing high purity phosphorus and phosphorus compounds in very high yields, above 75%.

It is a further object to provide a process which is readily adaptable to the production of radioactively labeled phosphorus and phosphorus compounds.

These and other objects are achieved according to this invention in a method for preparing phosphorus or phosphorus compounds comprising the steps of reacting $H_3PO_4$ with a lead compound to provide a $Pb_3(PO_4)_2$ intermediate and reacting said $Pb_3(PO_4)_2$ intermediate with $H_2$ at a temperature sufficient to cause the formation of gaseous phosphorus. The phosphoric acid starting material can be pure, radioactively labeled or impure such as wet process phosphoric acid. The gaseous phosphorus product can be condensed and recovered as high purity solid phosphorus. Alternatively, the phosphorus product can be reacted with suitable gaseous reagents to form phosphorus salts or other compounds. For example, the evolved phosphorus can be reacted with $Cl_2$ to form $PCl_5$ or $PCl_3$. The $PCl_5$ product can be converted to $PCl_3$ by contacting with excess elemental phosphorus or it can be reacted with $P_2O_5$ to form $POCl_3$.

DETAILED DESCRIPTION

In the first step of this process, $H_3PO_4$ is reacted with a lead compound such as $PbO$ to form $Pb_3(PO_4)_2$. The acid concentration is not critical to the reaction, with 0.1 M to 100% acid suitable for this step. Other lead compounds such as $Pb(NO_3)_2$ and $Pb(CH_3COO)_2$ which react with $H_3PO_4$ to form $Pb_3(PO_4)_2$ may be used, however, these salts, upon reaction with $H_3PO_4$, tend to form oxy compounds which form as films or indeterminate crystals, and do not react efficiently with gaseous reductants. The reaction of $H_3PO_4$ with $PbO$ produces a crystalline precipitate which is easily handled and which has a high surface area for reaction with $H_2$. The use of $PbO$ in the process results in phosphorus or phosphorus compound yields of greater than 90% while $Pb(NO_3)_2$ and $Pb(CH_3COO)_2$ would result in yields less than 50%, normally about 25%. Accordingly, the process will be herein illustrated using $PbO$ as an initial reactant with the understanding that any compound which forms $Pb_3(PO_4)_2$ upon reaction with $H_3PO_4$ will be operable in the process with the likelihood of lower yields. Of course, phosphoric acid precursors such as $P_2O_5$ and $H_2O$ may also be reacted with the lead compound to form the $Pb_3(PO_4)_2$ reaction product.

The $Pb_3(PO_4)_2$ is reduced to elemental P and Pb with $H_2$ at about 600° to 800° C. We have found that the hydrogen reduction of $Pb_3(PO_4)_2$ either proceeds at a lower temperature or produces a higher yield than hydrogen reduction of the phosphates of Ca, Mg, Al, La, Zn and Bi. The reduction of $Pb_3(PO_4)_2$ with $CH_4$ produced only one-half the yield of $H_2$ reduction. According to the process of this invention, gaseous $H_2$ may be passed over a refractory boat such as quartz which contains the $Pb_3(PO_4)_2$ product. Water formed in the reaction passes out as vapor in the $H_2$ stream. If this reaction is carried out in a tube furnace or other continuous flow reaction vessel, the phosphorus reaction product will collect as a solid in the cool part of the tube or in a condenser and Pb metal will remain in the boat. High purity phosphorus compounds are easily prepared by contacting the elemental phosphorus reaction product with gaseous reactants such as $Cl_2$, $Br_2$, etc. The reaction of solid phosphorus with $Cl_2$ proceeds rapidly at ambient temperatures. If $PCl_3$ is a desired reaction product, it is preferred to react the elemental phosphorus with excess chlorine to provide $PCl_5$, which can then be reduced by reaction with elemental phosphorus in the absence of chlorine to provide $PCl_3$. The reduction of $PCl_5$ to $PCl_3$ is easily accomplished by heating $PCl_5$ to cause it to sublime into a carrier gas (Ar, $N_2$, He, etc.) and passing the vapor at ambient temperature through a reductor containing red elemental phosphorus. An efficient method of carrying out this reaction is to pass $PCl_5$ vapor through a reactor containing inert aggregate material such as silica or borosilicate glass beads which have been coated with high purity red phosphorus. The reduction product $PCl_3$ will remain in the vapor phase and can then be recovered in a condenser at $-77°$ C. One can also produce $PCl_3$ by contacting $PCl_5$ with $P_2O_5$. In this embodiment, $PCl_5$ is deposited from the vapor phase onto a layer of $P_2O_5$ solid, heated to $\sim 100°$ C., whereupon $POCl_3$ is vaporized into a carrier gas and condensed at $0°$ C.

According to this invention, elemental phosphorus can be produced from wet process phosphoric acid in a semicontinuous process. The wet process acid is reacted with PbO in a continuous reactor, preferably under ultrasonic agitation. The $Pb_3(PO_4)_2$ product can be recovered via centrifugation and the unreacted $H_3PO_4$ returned to the reactor. The separated $Pb_3(PO_4)_2$ cake can be passed through a continuous dryer such as a kiln and then ground to a smaller particle size, if desired. The $Pb_3(PO_4)_2$ product can then be passed through a continuous hydrogen reduction furnace where it is contacted with $H_2$ and an inert carrier gas at temperatures up to about $800°$ C. During the $H_2$ reduction water is evolved. It may be desirable in some cases to regulate the reaction to allow all the water to be removed prior to phosphorus evolution, e.g., to prevent premature cooling of the product. This can be achieved by regulating the heating rate of the furnace or utilizing a multi-temperature zoned furnace. The reaction product gas, which contains elemental phosphorus carrier gas, unreacted $H_2$, and in some cases $H_2O$, can be passed through a water trap where it is cooled to just above the melting point of elemental white phosphorus ($44.1°$ C.). The liquid phosphorus can be tapped and cast into sticks. Molten lead is recovered from the furnace and cast. The slag is removed and the lead can be reoxidized to provide PbO which is returned to the reactor.

In many situations, it may be desirable to remove certain impurities from the wet process acid prior to treatment according to the present process. Sulfate and many cations can be removed by conventional cation and anion exchange processes. Uranium values can be recovered by any of several prior art techniques such as by the method described in commonly assigned U.S. Pat. No. 3,835,214.

DESCRIPTION OF THE PREFERRED EMBODIMENT

The process of this invention will be described in detail in reference to the preparation $^{33}P$-labeled $PCl_3$ and it will be apparent to those skilled in the art that minor modifications can be made to this process to provide for recovery of $PCl_5$, $POCl_3$ or elemental phosphorus. Of course, purification steps can be eliminated in the preparation of non-radioactive materials, where process economics are not so dependent upon yield.

While $^{32}P$ has been successfully used in radiopharmaceuticals, $^{33}P$ which has a much lower beta energy and a longer half-life would be desirable in many applications. $^{33}P$ is produced by an (n, $\alpha$) reaction with about 60% isotopicly enriched $^{36}Cl$ and is recovered carrier free (without nonradioactive phosphorus) as the orthophosphate. Both $^{32}P$ and $^{33}P$ in the form of phosphoric acid are available from the Isotope Sales Department of the Oak Ridge National Laboratory, Oak Ridge, Tenn. 37830. $^{33}P$ is normally supplied as a hydrochloric acid solution containing phosphate ions. Because of its very high specific activity a curie of $^{33}P$ has negligible mass and therefore must be used with carrier phosphorus or phosphorus compounds to facilitate handling during chemical processing. This is readily accomplished merely by mixing a known amount of labeled $H_3PO_4$ with nonradioactive $H_3PO_4$. Accordingly, any process for preparing $^{32}P$ or $^{33}P$ compounds should have the capability of using $H_3PO_4$ as a starting material.

Figure 1:
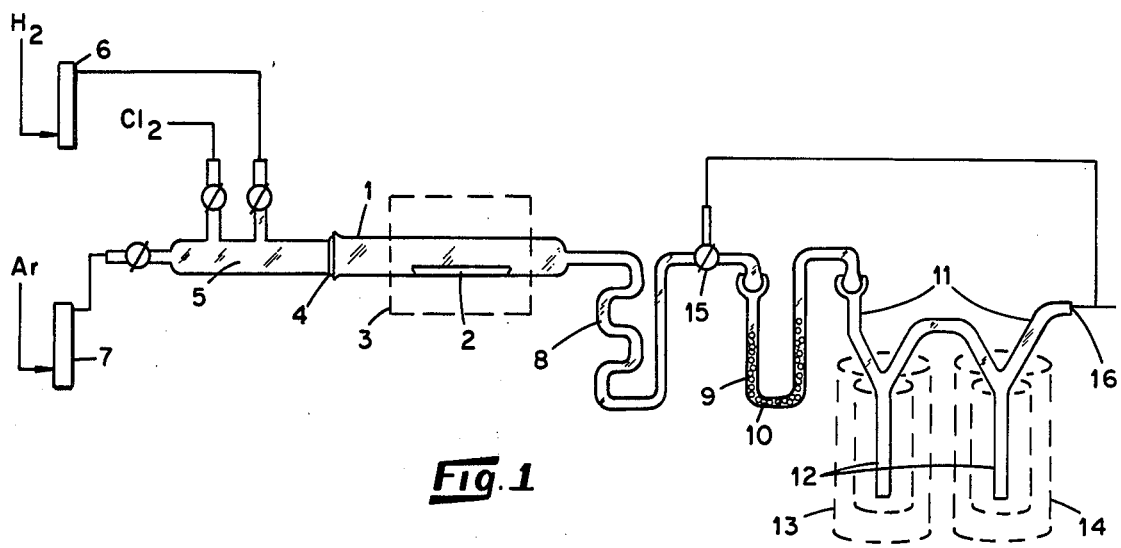
FIG. 1 is a diagram of a laboratory scale apparatus suitable for carrying out the process of the present invention for preparing $PCl_3$.

FIG. 1 is a diagram of laboratory scale apparatus suitable for carrying out the process of this invention for preparing $PCl_3$. Reduction tube 1 contains quartz boat 2 containing $Pb_3(PO_4)_2$ product from the reaction of $H_3PO_4$ with suitable lead compound. The reduction tube is contained at least partially in a conventional split tube furnace 3. In communication with the entrance 4 of the reduction tube is a gas manifold 5 to which is supplied $Cl_2$, $H_2$ and argon. $H_2$ and Ar are metered through flow meters 6 and 7. $Cl_2$ need not be metered since the progress of the chlorination reaction can be observed visually. At the exit of the reduction tube is product collection region 8 which communicates to U-tube 9 containing aggregate material 10 coated with red phosphorus. The exit of the U-tube communicates with product collection tubes 11 having condensing regions 12, contained in Dewar bottles 13 and 14. Valve 15 permits the recovery of $PCl_5$ which can bypass the U-tube reactor if desired and be recovered as a product. Sweep gases and unreacted $H_2$ escape through exit 16.

A. Preparation of $Pb_3(PO_4)_2$

Carrier-free $^{33}P$ obtained in the form of orthophosphoric acid and 1 N in HCl is subjected to prepurification by cation exchange to assure that no cations other than hydrogen are present. This prepurification step is suggested since other cations such as Ca or Mg may form phosphates which will not reduce at the low temperature of the process, thus lowering the yield, though not necessarily the purity of the product. The carrier solution of H$_3$PO$_4$ is made up with a known amount of phosphorus. Carrier solution equivalent to 20 mg phosphorus is added to a 50 ml polytetrafluoroethylene coated beaker containing the desired amount of carrier $^{33}$P-H$_3$PO$_4$ solution. The beaker contents are evaporated down to incipient dryness several times with a small volume of concentrated nitric acid in order to remove all chlorides. Lead chloride is quite insoluble and coprecipitates with Pb$_3$(PO$_4$)$_2$, thus lowering the yield. The residual material is taken up in a minimal amount of water for transfer to a 76×16×10 mm silica boat containing 238 mg PbO (1.06 mmoles) spread in a thin layer on the bottom. The boat is partially immersed in an ultrasonic water bath, Cole-Parmer Model No. 8.845-30, Cole-Parmer Instrument Co., 7425 North Oak Park Ave., Chicago, Ill. 60648. After approximately one hour under ultrasonic agitation at room temperature the metathesis has proceeded essentially to completion. The boat is then placed under a heat lamp, the water is evaporated off, and the Pb$_3$(PO$_4$)$_2$ is dried for one hour. The reaction is represented by:

$$3PbO + 2H_3PO_4 \rightarrow Pb_3(PO_4)_2 + 3H_2O \qquad (1)$$

B. Reduction of Pb$_3$(PO$_4$)$_2$ with Hydrogen

Figure 2:
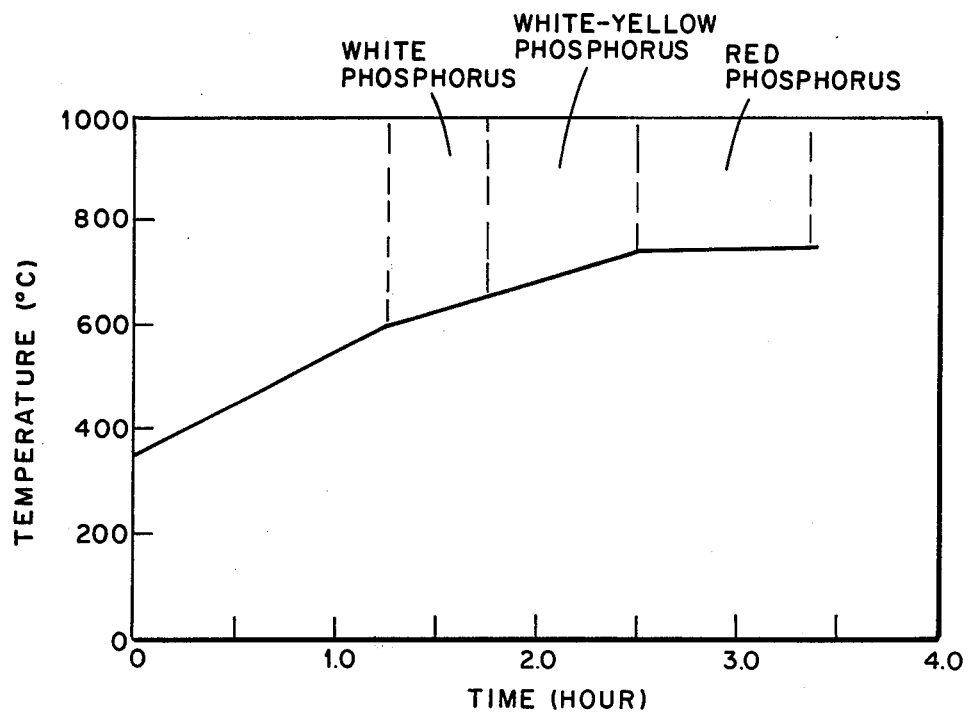
FIG. 2 is a graph illustrating the heating rate found suitable for permitting complete removal of water prior to evolution of gaseous phosphorus.

The boat is transferred to a quartz or Vycor reduction tube and placed in the center of the furnace. Argon or other inert gas is passed through the entire reaction train at 50 cm$^3$/min for 30 minutes to flush air out of the system. The inert gas flow is stopped and hydrogen is introduced at 25 cm$^3$/min. Valve 15 is adjusted to bypass the U-tube reactor. The electric furnace is turned on. It is preferred that the furnace be controlled initially to heat up at a gradual rate until a temperature of at least 500° C. is reached, so that all water will be removed from the system prior to the evolution of elemental phosphorus. The reaction proceeds in stages. First the casual water is removed up to about 300° C. and then as the hydrogen reduction begins the Pb$_3$(PO$_4$)$_2$ is thought to be transformed to unstable Pb$_3$P$_2$ with the release of additional water. The water evolution can be observed visually and the temperature must be maintained below about 500° C. until water evolution ceases. The furnace temperature can then rise to about 650°-800° C. whereupon the Pb$_3$P$_2$ decomposes and elemental phosphorus vapor is transported to the cool end of the reduction tube where it is deposited as white, yellow, orange and red phosphorus. As the temperature rises, the phosphorus is liberated more readily. At about 600° C. small amounts of PH$_3$ may appear. Escaping phosphorus species can be absorbed in a water scrubber and activated carbn trap located downstream of exit 16. The heating rate depicted in FIG. 2 has been found to be suitable for this reaction, permitting complete removal of water prior to evolution of gaseous phosphorus. The phosphorus product changes form as indicated under the influence of time, temperature, and light exposure.

About 1 to 1½ hrs. at 650°-800° C. is usually sufficient for the reduction of all Pb$_3$(PO$_4$)$_2$. The gas flow is reduced 10-20 cm$^3$/min during the collection of elemental phosphorus in order to minimize losses by evaporation and entrainment. At the end of the reduction the heat is turned off and the furnace is removed from around the reduction tube. The hydrogen flow is stopped and 10-20 ml/min inert gas is turned on to flush hydrogen out of the tube. At this point the process is most vulnerable to oxygen contamination and the pressure of the gas in the tube should not fall below atmospheric pressure. The reaction for this step is represented by:

$$Pb_3(PO_4)_2 + 8H_2 \rightarrow 3Pb + 2P + 8H_2O \qquad (2)$$

Reaction 2 is more fully described in J. C. Hutter, Ann. Dev. Chim., 12 Serie, 1.8 (1953), a treatise on hydrogen reduction of phosphates. The elemental phosphorus product can be directly recovered by passing the vapor directly into cold water causing white phosphorus to condense under water, i.e., eliminating U-tube 9.

C. Chlorination of Elemental Phosphorus to PCl$_5$

An excess of oxygen free chlorine gas is introduced through the gas manifold 5 into the inert gas filled tubes at a very low flow rate, virtually zero. The reaction proceeds at room temperature and its progress is easily observable by the formation of yellowish-white PCl$_5$ rapidly on the walls of the reduction tube. One-half hour is allowed to ensure that the reaction goes to completion. Valve 15 should be closed during the chlorination period in order to minimize PCl$_5$ losses. Excess chlorine is then flushed out by passing 1-20 cm$^3$/min of inert gas through the tube. The reaction is represented by:

$$2P + 5Cl_2 \rightarrow 2PCl_5 \qquad (3)$$

D. Reduction of PCl$_5$

Valve 15 is readjusted to allow carrier gas to flow through the reductor. The Dewar bottles 13, 14 can be maintained at −77° C. by filling them with a solid CO$_2$-trichloroethylene slush so that the collection tubes are immersed in the slush. The PCl$_5$ deposit on the reduction tube can be heated with a hot air gun and caused to sublime. A 10-20 cm$^3$/min stream of inert gas is passed through the U-tube reductor containing phosphorus deposited on borosilicate glass beads. The reductor is also heated with the hot air gun to at least about 70°-80° C. PCl$_3$ is formed in the gas phase within the U-tube reductor and collects in the bottom of the condenser within the Dewar bottles. The reaction is represented by:

$$3PCl_5 + 2P \rightarrow 5PCl_3 \qquad (4)$$

The radiophosphorus specific activity of the PCl$_5$ is diluted 3:5 by this reaction. The $^{33}$PCl$_3$, approximately 0.090 ml, which is collected in Dewar bottle 13 may be redistilled (heating with warm water) to the second trap 14, if desired. This redistillation step should be carried out gradually to prevent decomposition of PCl$_3$, i.e., gradually enough to prevent the formation of phosphorus. Inert gas flow should be continued throughout the system to transport the reaction products. This redistillation slightly decreases the POCl$_3$ content, however, any elemental phosphorus carried over from the U-tube reductor is left behind in condenser 13. The source of POCl$_3$ contamination is normally O$_2$ and H$_2$O present in the gases and the phosphorus employed in the U-tube reductor. A convenient way of recovering the $^{33}$PCl$_3$ product is to seal off the base of the condenser tube using a small gas oxygen torch, forming an ampule.

Chemical yields for the preparation of $^{33}PCl_3$ have averaged better than about 90%.

It will be apparent that several of the features of this process for preparing high purity phosphorus or phosphorus compounds can be modified without departing from the concept of this invention, and such modifications are contemplated as equivalents of the specific applications described herein and covered by the appended claims.

What is claimed is:

1. A method for preparing phosphorus by the steps comprising:

reducing $Pb_3(PO_4)_2$ in $H_2$ at a temperature less than about 500° C. and sufficient to form a reaction product upon the evolution of water;

continuing the reduction at said temperature less than about 500° C. until the evolution of water ceases;

reducing the resulting water-free reaction product in $H_2$ at a temperature in the range of 600°–800° C. to decompose said reaction product and form gaseous phosphorus; and thereafter condensing the gaseous phosphorus and recovering said phosphorus.

2. The method for preparing phosphorus as claimed in claim 1 wherein said temperature less than about 500° C. is a temperature in the range of about 300°–500° C.

3. The method for preparing phosphorus as claimed in claim 1 wherein said $Pb_3(PO_4)_2$ is a crystalline reaction product formed by reacting $H_3PO_4$ with PbO.

* * * * *